June 14, 1949.  W. R. HARLOW  2,472,823
COMBAT CAMERA HAVING HANDGRIP OPERATING MEANS
Filed Sept. 13, 1946  4 Sheets-Sheet 1

Inventor
William R. Harlow
By M. A. Hayes
Attorney

June 14, 1949. W. R. HARLOW 2,472,823
COMBAT CAMERA HAVING HANDGRIP OPERATING MEANS
Filed Sept. 13, 1946 4 Sheets-Sheet 2

Inventor
William R. Harlow
By M. Hayes
Attorney

June 14, 1949.　　　　W. R. HARLOW　　　　2,472,823
COMBAT CAMERA HAVING HANDGRIP OPERATING MEANS
Filed Sept. 13, 1946　　　　　　　　　　　　4 Sheets-Sheet 3

Inventor
William R. Harlow

By

Attorney

June 14, 1949.  W. R. HARLOW  2,472,823
COMBAT CAMERA HAVING HANDGRIP OPERATING MEANS
Filed Sept. 13, 1946  4 Sheets-Sheet 4

Inventor
William R. Harlow

By M. O. Hayes
Attorney

Patented June 14, 1949

2,472,823

UNITED STATES PATENT OFFICE 2,472,823

COMBAT CAMERA HAVING HANDGRIP OPERATING MEANS

William R. Harlow, United States Navy

Application September 13, 1946, Serial No. 696,976

1 Claim. (Cl. 95—11)

(Granted under the act of March 3, 1883, as amended April 30, 1928; 370 O. G. 757)

The present invention relates to cameras and more particularly to a camera that may be used by pilots of aircraft, personnel on ships, observers on the ground and any inexperienced individuals.

It is an object of the present invention to provide a camera that is rugged, suitable for operation with one hand and one that can be operated by inexperienced persons.

Another object of the present invention is the provision of a camera, the mechanism of which is not affected by extreme climatic conditions.

A still further object of the present invention is the provision of a camera having means for keeping the lens clean and dry.

A still further object of the present invention is the provision of external controls that can be operated with gloved hands.

A still further object of the present invention is the provision of a camera so simple in construction that it can be taken apart for repairs by a single instrument.

A still further object of the present invention is the provision of means for automatically folding the finder, sight and lens.

A still further object of the present invention is the provision of means for preventing accidental operation of the camera shutter and exposure of the film.

With such objects in view, as well as other advantages which may be incident to the use of the improvements, the invention consists of the parts and combinations thereof hereinafter set forth and claimed, with the understanding that the several necessary elements constituting the same may be varied in proportions and arrangement without departing from the nature and scope of the invention as defined in the appended claim.

In order to make the invention more clearly understood there are shown in the accompanying drawings, means for carrying the invention into practical effect, without limiting the improvements in their useful application to the particular construction and arrangement which, for the purpose of explanation, have been made the subject of illustration.

Figure 2:
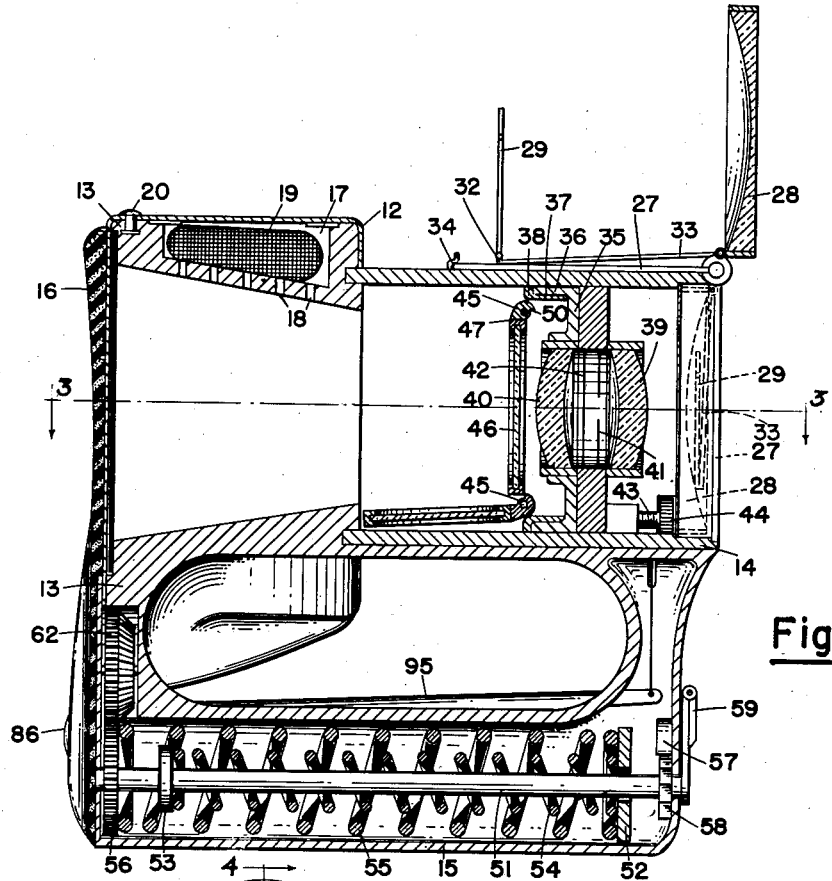
Fig. 2 is a vertical sectional view of the camera taken on an axial plane.
Figure 3:
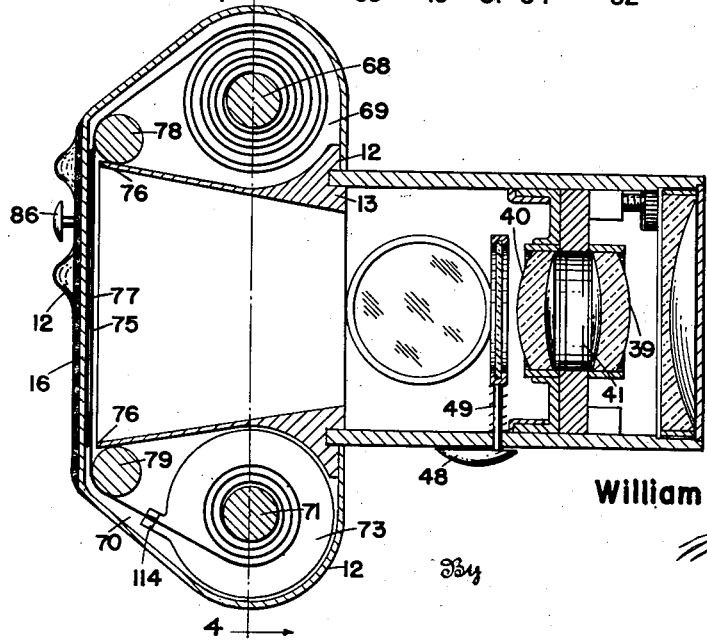
Fig. 3 is a sectional view taken on line 3—3 of Fig. 2.
Figure 5:
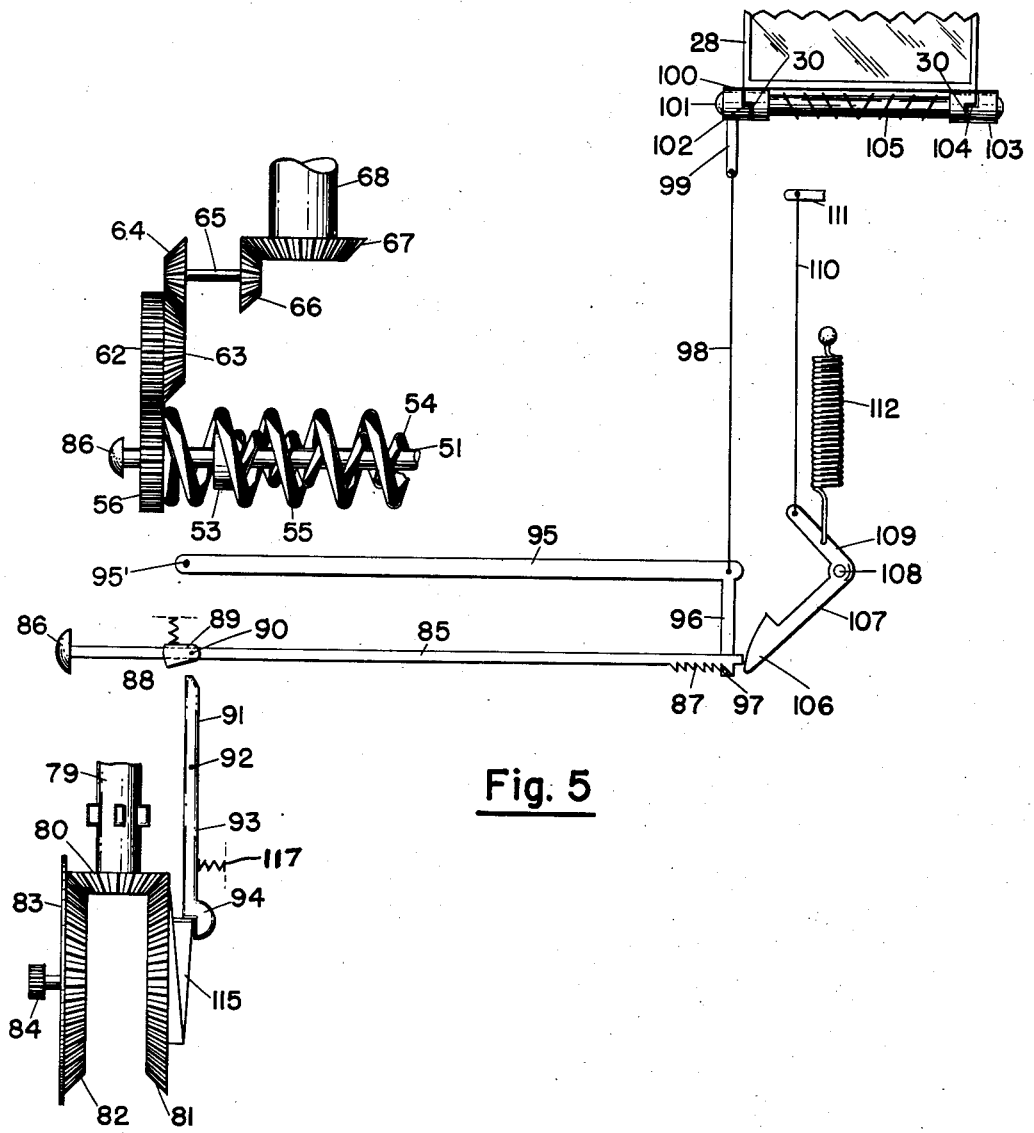
Fig. 5 is a diagrammatic view of the internal mechanism of the camera.

In the drawings the numeral 10 represents a camera having a housing 11 that may be of metal or any other suitable material, and it comprises portions 12, 13 and 14 that are adapted for interlocking engagement, the portion 13 being in the form of a frame, the lower portion 15 being formed into a hand grip, thus providing a means for grasping and holding the camera by one hand of an operator. The housing on one end is provided with a cheek plate 16 that may be of any suitable material. The portion 13 is provided with a chamber 17 (commonly known as a desiccant chamber) and it is provided with a plurality of bores 18, the chamber housing a moisture absorbing material 19. The portion 12 is secured to the portion or frame 13 by a bayonet lever latch 20. The portion 14 has provided in one side wall a click track 21 having an indicator pointer 22, and in spaced relation from the click track 21 is a shutter click track 23 having an indicator pointer 24. On one face of the portion 14 and disposed between click tracks 21 and 23 is indicia 25. To the end 26 of the portion 14 there is pivotally mounted a plate 27 that carries a view finder 28 and a sight 29, the plate 27 serving as a lens cap as shown in Figs. 2 and 3. The view finder 28 is provided with L-shaped cut out portions forming dogs 30 as shown in Fig. 5. The sight 29 is pivotally mounted on a pin 32, and to the bottom end of the sight 29 is secured one end of spring rods 33, the opposite ends of the rods being secured to the view finder 28. If desired the view finder assembly may be held in open position by a lock 34. Within the portion 14 there is a mount 35 having a backward extension 36 that intermeshes with an inner sleeve 38 that is provided with a forward extension 37. The mount 35 carries lenses 39 and 40, iris diaphragm 41 and shutter 42, the mount 35 being provided with a threaded screw 43. Movement of the mount 35 is controlled by a thumb wheel 44 that is in engagement with threaded screw 45. Mounted internally in the portion 14 and behind the lens 40 are filter mounts 45 in which are mounted filters 46. The filter mounts 45 are connected to rods 47 that connect to exterior controls 48. A spring 49 holds the filter out of the optical system, except that it is positively snapped into it by engaging the snap 50.

Mounted within the portion 15 is a shaft 51 that is provided with clamp washers 52 and 53. Encompassing the shaft 51 are springs 54 and 55, spring 54 being connected to the shaft 51 by clamp washer 53. The spring 55 is connected to a main driving gear 56, that is on one end of the shaft 51, and adjacent to the other end of the shaft 51 is a dog 57 that sides on a ratchet 58. To the end of shaft 51 is secured an arm 59 having a handle 60 that is hingedly mounted and when not in use fits snugly into a slot 61.

Meshing with the main driving gear 56 is a floater gear 62 having a bevel 63, the gear 62 being mounted in one end wall of portion 13. The bevel 63 meshes with a bevel gear 64 that is mounted on the end of shaft 65, the other end of the shaft having a bevel gear 66 that meshes with a bevel gear 67 that is secured to the end of a take-up spool 68, the spool being housed in compartment 69 that is formed in the portions 12 and 13. The opposite sides of portions 12 and 13 have a companion compartment 70 that houses a spool 71 having a basket gear 72 attached to the bottom end of the spool 71 and to the upper end a handle 116, the spool being housed in a cassette 73. A spring 74 engages the basket gear 72 putting tension on it, but allowing it to turn in either direction. Film 75 is under spring tension on the take-up spool 68 and it is held flat against the guide surfaces 76, pressure plate 77 and guide roller 78. The film 75 is metered from the spool 71 by a metering roller 79, the metering roller having secured to one end a beveled gear 80 that meshes with a cam gear 81 and a beveled gear 82, the gear 82 having secured thereto, or provided with a frictionally connected counter dial 83 and a knob 84. Mounted in the hand grip 15 is a rod 85 having a button head 86, the opposite end of the rod being provided with notches 87. Adjacent the button head 86 of the rod 85 is a spring 88 and a dog 89, the dog being pivotally mounted at 90 and adapted to engage bar 91 that is pivotally connected at 92 to a bar 93, the lower end of the bar being provided with a dog 94.

The handle 15 is provided with a pressure bar 95, pivoted at 95' one end of the bar being provided with an arm 96 having a locking element 97 that is adapted for engagement with the notches 87. To the end of the bar 95 there is secured one end of an element 98, the other end of the element being connected to a flexible steel tape 99 on drum 100 carried by pin 101. The drum is provided with an L-shaped cutout portion 102 and likewise a companion drum 103 at the opposite end of pin 101 is provided with an L-shaped cutout portion 104, the cutout portions being adapted to engage the cutout portions in the dogs 30. The pin 101 connects the drums, view finder and plate, the pin being encompassed by a spring 105.

The end of rod 85 engages the cam 106 of the bell crank 107 that is pivotally mounted at 108, the arm 109 having connected to its end, one end of an element 110, the opposite end of element 110 being connected to a shutter arm 111. The bell crank is normally held in an inoperative position by spring 112 as shown in Fig. 5 one end of the spring connected to the arm 109 the opposite end anchored in the camera.

Figure 1:
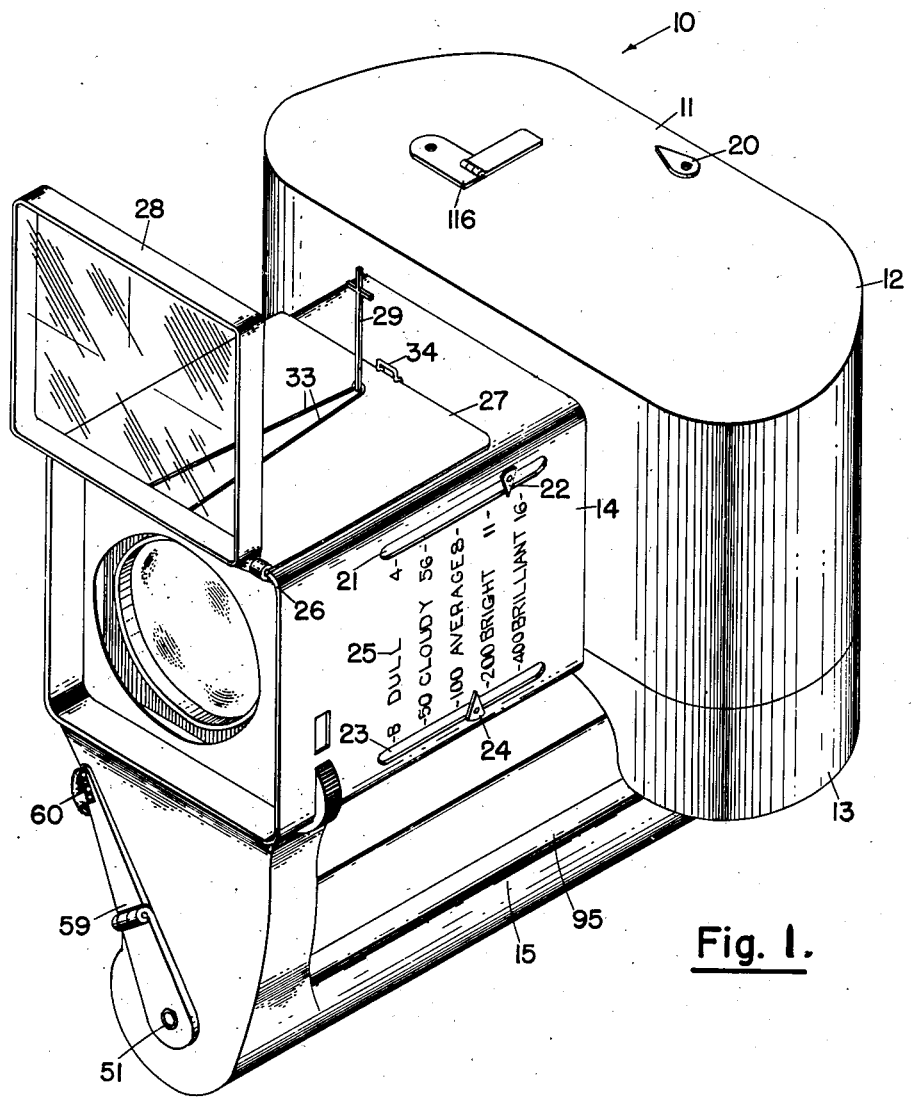
Fig. 1 is a perspective view of the camera.
Figure 4:
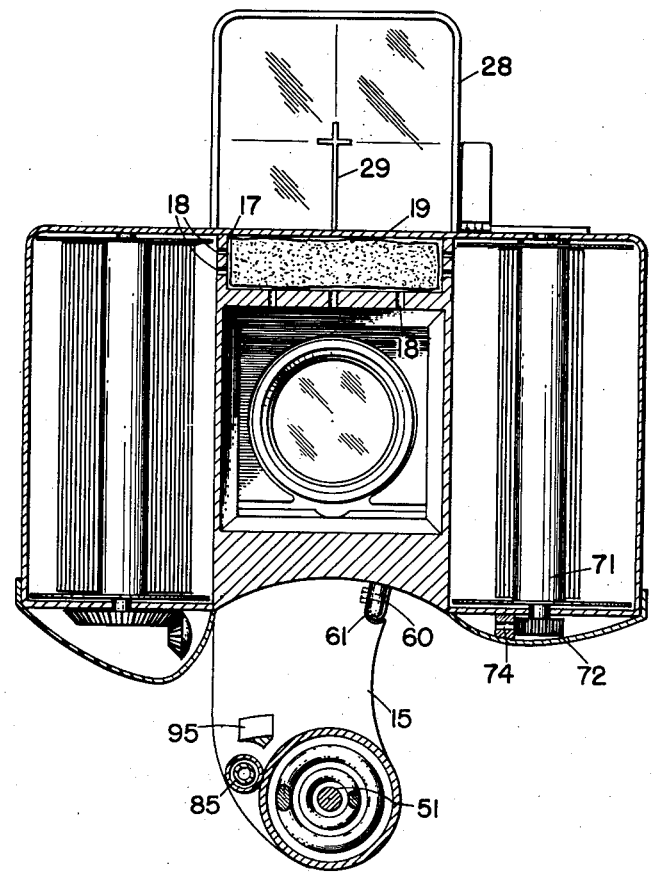
Fig. 4 is a sectional view taken on line 4—4 of Fig. 3.

In the operation of the present device, an operator's hand fits over the hand grip 15 with the thumb resting on the exposure button head 86. The fingers are in engagement with the pressure bar 95 that when pressed causes a downward tension on the element 98. This action through the flexible steel tape 99 on the drum 100 rotates the plate 27, 270° from the position covering the lens to a position flat on the top of portion 14. As the plate 27 passes the 90° position in rotation, the cutout portions 102 and 104 engage the dogs 30 on the view finder 28 and move it during the last 180° of travel to the upright position shown in Figs. 1, 2 and 4. During the first 90° of travel, the spring rods 33 raise the sight 29 into place, and if desired the plate 27 may be held in the operative position by the lock 34. Pressure on the finger bar 95 also lowers the locking element 97 allowing the exposure bar 85 to be operated, and this operation puts additional tension on the spring 105 which returns the finder and plate 27 to a closed position as soon as tension on the bar 95 is released.

The springs 54 and 55 in the handle 15 are wound by the handle 59 turning the shaft 51 in a counterclockwise direction, which turns the spring 54 which is connected to the shaft 51. As the springs are wound, the clamp washer 52 slides along the shaft 51 as the size and length of the spring is reduced by tension. One end of spring 55 being connected to the main driving gear 56 keeps the gear under tension. The spring when wound is sufficient to operate the camera through full 24 exposures, and will give a recycling time of under one second, the dog 57 on the ratchet 58 prevents the turning of the shaft 51 in a clockwise direction, keeping the springs 54 and 55 wound. The main drive gear 56 meshes with the floater gear 62, the bevel 63 on the floater gear meshing with gear 64 rotates gear 66 through shaft 65, gear 66 being in mesh with gear 67 on the end of take-up spool 68 rotates the spool which is always under tension when the springs 54 and 55 are wound. Film 75 on spool 71 in the cassette 73 is threaded through the light lock 114 trained over the metering roller 79, across the guide surfaces 76 and focal plane, over guide roller 78 to spool 68. The film 75 is under constant spring tension on spool 68 which keeps it flat against the guide surfaces 76 and it is metered by the metering roller 79, the pressure plate 77 assisting in keeping the film flat and tight over the focal plane.

The iris diaphragm 41 is of a conventional type with openings from $f/4$ to $f/16$ and it may be controlled by a photo electric cell, however, in the present showing the aperture is controlled by the movement of pointer 22 along click track 21. As shown by the indicia, the click operates a $f/4$ Dull; $f/5.6$ Cloudy; $f/8$ Average; $f/11$ Bright; and, $f/16$ Brilliant; however, the iris may be set at any intermediate point.

The shutter speed is selected manually on the click track 23 through the indicator pointer 24 and set adjacent the indicia "B"; $1/50$; $1/100$; $1/200$ and $1/400$, on the side face of the element 14. The track may be locked at any desired speed (depending on the film used), for use in conjunction with the "Dull to Brilliant" iris diaphragm setting scale previously described. The shutter is a between-the-lens shutter, however, a behind-the-lens shutter, either louvre, focal plane or leaf type may be used permitting shutter speeds to $1/1000$ of a second.

The film metering is activated by the return of the rod 85 through the spring 112 after exposure. When the exposure button 86 is pushed in the spring 88 is depressed, the dog 89 engaging the bar 91. On its return the dog 89 moves the bar 91 on the pivot 92 compresses the spring 117 and unseats the dog 94 which permits one revolution of the cam gear 81 before the cam stop 115 again engages the dog 94 stopping the action. During the one revolution of the cam gear 81, the gear 80 makes two revolutions advancing the film 75.

The back plate or element 12 is unlocked by a half turn of the bayonet lock 20 allowing element 12 to be removed, exposing the spools for removing and reloading. After the last exposure, the folding handle 116 that is connected to spool 71 is turned to rewind the film after exposure, the spring 74 putting resistance on the gear 72 but allowing it to turn in either direction.

The exposure counter dial 83 on gear 82 can be set to the proper number by turning the knob 84.

The cheek plate 16 is shaped to fit the cheek and permits the camera to be held firmly against the face by an operator holding the camera by the hand grip 15.

The invention described herein may be manufactured and used by or for the Government of the United States of America for governmental purposes without the payment of any royalties thereon or therefor.

What is claimed is:

In a camera for one hand operation the combination of a case, a hand-grip member secured to the bottom of said case, a lens and shutter unit arranged telescopically in said case, a lens cover hinged to said case, a two-element view finder hinged to said case, both said lens cover and said view finder having the same hinge and being spring-loaded to a closed position, gripping pressure responsive means in said hand-grip member adapted to simultaneously open said lens cover and move said view finder to operative position, a spring motor in said hand-grip member, a film transport gear train in said case driven by said spring motor, trigger means on said hand-grip member operable by the thumb of the gripping hand to open the shutter of said lens and shutter unit and to initiate operation of said film transport gear train, and locking means on said gripping pressure responsive means for restraining operation of said trigger means when said lens cover is closed.

WILLIAM R. HARLOW.

REFERENCES CITED

The following references are of record in the file of this patent:

UNITED STATES PATENTS

| Number | Name | Date |
|---|---|---|
| 1,236,419 | Folmer | Aug. 14, 1917 |
| 1,246,328 | Rutzen | Nov. 13, 1917 |
| 1,907,437 | Nopper | May 9, 1933 |
| 2,414,083 | Borden | Jan. 14, 1947 |

FOREIGN PATENTS

| Number | Country | Date |
|---|---|---|
| 234,823 | Great Britain | Dec. 17, 1925 |
| 464,420 | Great Britain | Apr. 19, 1937 |